Nov. 3, 1959 H. AUGUSTIN 2,911,481

MAGNETIC HEAD COMPRISING A CORE OF FERRITE

Filed Feb. 21, 1955

INVENTOR

HERBERT AUGUSTIN

BY Young, Emery & Thompson

ATTYS.

2,911,481
Patented Nov. 3, 1959

2,911,481

MAGNETIC HEAD COMPRISING A CORE OF FERRITE

Herbert Augustin, Motala, Sweden, assignor to Industriaktiebolaget Luxor, Motala, Sweden, a corporation of Sweden Application February 21, 1955, Serial No. 489,637

Claims priority, application Sweden February 27, 1954

2 Claims. (Cl. 179—100.2)

The present invention relates to a magnetic head comprising a core of ferrite.

It is known to use soft magnetic, non-metallic materials, e.g. ferrites, as core material in magnetic reproducing heads. These materials have some very desirable properties such as high mechanical wear resistance, which increases the life of the heads, and high specific resistance, which reduces the losses. But they also have some disadvantages, which limit their applicability as core material. Such a disadvantage is the relatively low permeability, which in recording heads causes a level field characteristic giving a poor recording in relation to the tape speed at high frequencies. In reproducing heads a low permeability results in a decreased sensitivity and in erasing heads it results in a low transverse component of the magnetic field, thereby causing difficulties in erasing the transverse component, which is present in all magnetic recordings. The ferrite materials have another disadvantage in their relatively low saturation value, which in recording and reproducing heads is perceivable in substantially the same manner as the low permeability. If, however, the reproducing head is properly dimensioned, the disadvantage referring to the low saturation value can be eliminated.

Heretofore it has been proposed to line a ferrite head with a thin plate consisting of a material having substantially higher permeability e.g. iron nickel alloy (Mumetal). Such an arrangement, however, has certain disadvantages, which are avoided by the present invention. The generally used iron nickel alloys must be subject to a careful heat treatment for giving them the desired magnetic properties and they must thereafter be protected against any mechanical deformation. Thus it may be possible to line such a plate of high permeable material on flat surfaces without any deformation risk. Due to construction reasons a magnetic head is, however, made with curved surfaces, which it is desirable, at least in a reproducing head to line together with the flat surfaces of the core. In the manufacture of this head a deformation of the high permeable material cannot be avoided. It is easy to understand this deformation risk, if it is considered that the high permeable material ought to have a thickness of 30 $\mu$ or less as there otherwise will be losses, which cause partially losing of the advantage achievable with the construction. The lined magnetic head mentioned above has also another disadvantage this being the additional gap arising between the ferrite core and the lining. As the working gaps in modern magnetic heads for low tape speeds are in the magnitude of 10 $\mu$ and less the additional gap between lining and ferrite will be of such a magnitude that it cannot be overlooked, especially in the case in which the core is lined along its whole length. When constructing the head the lining of the ferrite core is made on the insides of the gap up to the guide path for the tape whereas lining of the guide path itself is avoided in order to make use of the high wear resistance of the ferrite for said path. This additional gap between the lining and the ferrite core in the guide path will influence the field characteristic in a rather uncontrollable manner. It is thus desirable to reduce said additional gap to an absolute minimum. This means, however, great difficulties as to the uniform quality of the manufactured heads because of the fact that a minimum absolute deviation of a small gap means a high percent deviation.

It is an object of the present invention to eliminate the disadvantages mentioned.

According to one embodiment the intimate magnetic connection between the metal lining and the ferrite core is obtained by applying the lining by an electrolytic precipitation of iron or iron alloy. A lining produced in this way can be given such magnetic properties that a sufficiently high permeability and saturation is obtained. The thickness of the lining can, during the precipitation in a simple manner, be controlled so it has just the desired value and it can without difficulty be applied onto desired portions of arbitrarily curved ferrite cores. This procedure affords the possibility of applying a metal lining on e.g. heads of the ring type, which lining entirely eliminates the back gap. The result of the procedure can be further improved by a subsequent electro-polishing of the lining whereby a very sharp-edged working gap can be obtained.

Another way to obtain an intimate magnetic connection between a metal lining and arbitrarily curved surfaces of the ferrite is to apply the lining e.g. by vacuum evaporation with metal.

The metal lining applied in accordance with the invention may preferably be given desirable magnetic properties by a subsequent heat treatment in known manner.

When magnetically recording signals have an extremely steep input flank or wave form, special advantages are attained with a head according to the invention. In such a recording a rather high transverse component is present in the tape also in the case of the normal longitudinal recording. It has proved particularly difficult to erase this transverse component with hitherto customary heads having a core of Mumetal. It is assumed that this difficult erasing is caused by an insufficient transverse component in the erasing field over the gap. If the Mumetal core without noteworthy change of shape is substituted by a core of ferrite the tranverse component of the field is further reduced because of the lower permeability and saturation of the ferrite. It has been proposed to increase the transverse component by inserting a piece of ferrite metal in the working gap so that there are two gaps of reduced gap lengths.

Hereby the transverse component of the field can be increased without decreasing the longitudinal component at the same time.

An erasing head according to the invention is shown in the accompanying drawing, wherein.

Figure 2:
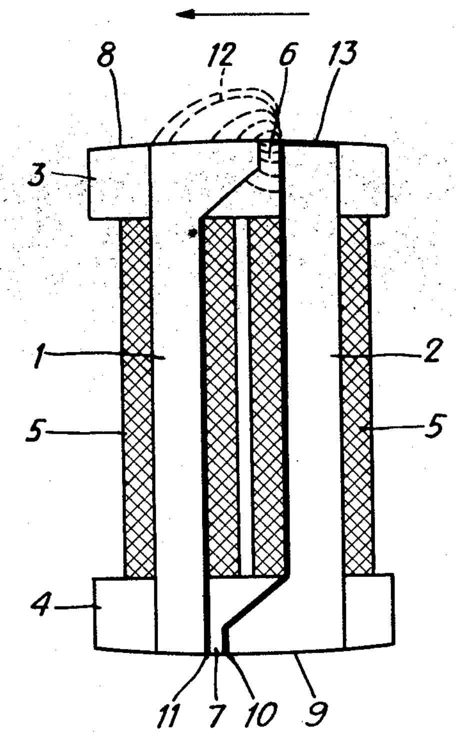
Fig. 2 shows a section of the same head on line II—II of Fig. 1.

In the drawing 1 and 2 designate two pole pieces consisting of ferrite, 3 and 4 two end parts of a magnetic material having approximately the same or slightly lower mechanical wear resistance than ferrite, e.g. a ceramic material, 5 a winding and 6 and 7 are two gaps. Polished guide paths 8 and 9 are provided for the tape. The lining according to the invention is indicated by reference numerals 10 and 11.

Figure 1:
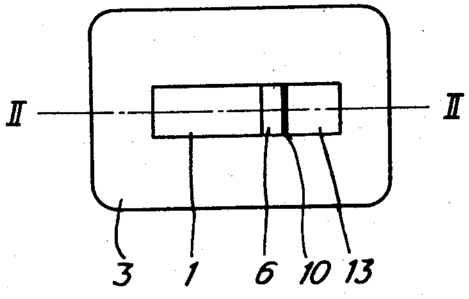
Fig. 1 is a top view of the head.

In this head the increasing of the transverse component is caused by the flux concentration in the metal lining 10 as is indicated by the field lines 12 in Fig. 1. This metal lining 10, which is applied to the pole piece 2, reaches the upper gap 6, while the metal lining 11 on the second pole piece 1 ends somewhat below gap 6. Thus the field is given a high transverse component simultaneously with a high longitudinal component. A further increase of the transverse component may be achieved if the metal lining on both pole pieces reaches the guide path as is shown for the lower gap 7, but this will be attained somewhat at the expense of the longitudinal component. Another way of further increasing the transverse component without decreasing the longitudinal component at the same time, is to have the parts of the pole pieces forming the guide paths coated with strip 13 of a non-magnetic material with low specific resistance, e.g. hard chrome (Fig. 1). In this coating eddy currents arise, which prevent the field lines from leaving the pole pieces and concentrate the flux in the metal lining 10. The gaps are preferably in known manner filled with metal.

The pole pieces 1 and 2 are preferably sintered to the end parts 3 and 4 consisting of ceramic material. The end parts 3 and 4, which form a continuation of the guide path for the tape, thus will have a compact and intimate connection with the ferrite core and especially its part of the guide path. This guarantees an even and minimum wear together with an effective protection of the brittle ferrite material against microscopic breaking off. The connection is still more intimate as the ferrite itself also is a sintered product consisting partly of a ceramic material. It is principally unimportant if the sintering process is made in one or two operations as in both cases the mechanical dimension tolerances can be ignored. In the case of a pure mechanical assembling procedure, the mechanical dimensions' tolerances determine the quality of the product to a great extent.

What I claim is:

1. A magnetic head comprising a core comprising two portions of ferrite material defining a magnetic circuit provided with a working gap therebetween, metallic linings electrolytically deposited on and intimately bonded to said portions on each side of said gap, said linings extending along substantially all of two faces of one of said portions and also extending along substantially a face of the other portion to a point below the working gap, said linings being thinner than the width of said gap and consisting of soft magnetic material having permeability and saturation values higher than the ferrite material for enabling recording of signals having an extremely steep input wave form.

2. A magnetic head according to claim 1, wherein said metallic linings electrolytically deposited are of such a thickness that the linings during recording operation work in the saturation range, while the linings during reproduction operation work below the saturation range.

References Cited in the file of this patent

UNITED STATES PATENTS

| | | |
|---|---|---|
| 2,677,019 | Buhrendorf | Apr. 27, 1954 |
| 2,711,945 | Kornei | June 28, 1955 |
| 2,715,659 | Ibuka | Aug. 16, 1955 |

FOREIGN PATENTS

| | | |
|---|---|---|
| 807,725 | Germany | July 2, 1951 |
| 669,458 | Great Britain | Apr. 2, 1952 |
| 1,036,256 | France | Apr. 22, 1953 |